United States Patent [19]

Nishida et al.

[11] Patent Number: 4,542,429
[45] Date of Patent: Sep. 17, 1985

[54] APPARATUS FOR REDUCING STARTING ADHESION BETWEEN A MAGNETIC DISC AND FLYING HEAD

[75] Inventors: Hiroshi Nishida, Kanagawa; Toshiyuki Haruna, Odawara, both of Japan

[73] Assignee: Hitachi, Ltd., Tokyo, Japan

[21] Appl. No.: 340,700

[22] Filed: Jan. 19, 1982

[30] Foreign Application Priority Data

Jan. 28, 1981 [JP] Japan .................................. 56-10241

[51] Int. Cl.[4] .......................... G11B 5/60; G11B 17/32; G11B 21/02
[52] U.S. Cl. ...................................... 360/103; 360/75; 360/78
[58] Field of Search ........................ 360/103, 106–107, 360/75, 105, 78, 131, 135, 133, 86, 104

[56] References Cited

U.S. PATENT DOCUMENTS

| | | | |
|---|---|---|---|
| 4,120,010 | 10/1978 | Mitsuya et al. | 360/103 |
| 4,198,666 | 4/1980 | Manzke et al. | 360/106 |
| 4,275,427 | 6/1981 | Bjordahl | 360/106 |
| 4,314,291 | 2/1982 | Oda et al. | 360/106 |
| 4,331,991 | 5/1982 | Morehouse et al. | 360/106 |
| 4,445,188 | 4/1984 | Barrett | 360/106 |

Primary Examiner—Bernard Konick
Assistant Examiner—Steven R. Garland
Attorney, Agent, or Firm—Antonelli, Terry & Wands

[57] ABSTRACT

In a magnetic disc memory apparatus in which a magnetic head is in contact with a surface of a magnetic disc when the disc is stationary and caused to float upon rotation of the disc, the magnetic head contacting the magnetic disc is slightly moved in the radial direction of the disc immediately before rotation of the disc, whereby the rotation of the magnetic disc is started after adhesion between the magnetic disc and the magnetic head has been obviated.

12 Claims, 8 Drawing Figures

APPARATUS FOR REDUCING STARTING ADHESION BETWEEN A MAGNETIC DISC AND FLYING HEAD

BACKGROUND OF THE INVENTION

The present invention relates to a magnetic disc memory apparatus such as of a CSS (Contact Start/Stop) Type.

In recent years, the disc memory of a CSS system or type has occupied a major part of the magnetic disc memories destined for use as external storage equipment for computer systems. In this connection, with the term "CSS system", such a magnetic disc memory is meant in which a floating magnetic head slider is in contact with a disc surface when the magnetic disc is stationary, while the floating head slider is caused to float above the disc surface upon rotation of the latter. The magnetic disc memory of the CSS type is an improvement upon the magnetic disc memories heretofore in use in that a head loading mechanism of a complicated structure can be spared and that a loading force of the magnetic head (i.e. a force produced between the head and the disc) can be reduced to less than 1/10 as compared with that of the hereto known system, and thus enjoys advantages such as improved reliability, inexpensiveness and others. With the above-mentioned head loading system, the magnetic head is held at a position spaced from the disc surface when the disc is in the stationary state, and the magnetic head is pressed toward the disc surface under a predetermined pressure only after the disc has attained a steady rotating state, whereupon the magnetic head is brought to the balanced floating state under aerodynamic pressure produced at a slider portion of the magnetic head. Such a CSS type magnetic disc memory apparatus is disclosed, e.g., in U.S. patent application Ser. No. 337,032 filed Mar. 1, 1973, now U.S. Pat. No. 3,823,416, (Corresponding to Japanese Patent Application Laid-Open No. 121,514/74 laid open Nov. 20, 1974).

By the way, at present manufacturers are making every effort to increase the storage capacity of the magnetic disc memory. To this end, it is important to increase the number of tracks provided for each disc (increasing of the track density) and to increase the storage capacity of each track (increasing of the bit density). Above all, in order to increase the bit density, it is indispensable to hold stably the magnetic head gap at a position very close to the disc surface in consideration of magnetic recording characteristics as required. For this reason, roughness of the disc is reduced to thereby decrease a floating distance between the magnetic head and the disc surface. More particularly, referring to FIG. 1 of the accompanying drawings, a number of projections or protrusions 6 remain on the surface of the magnetic disc 8 without having been removed in the course of the manufacturing process and provide a major factor which determines the surface roughness of the disc. Reference numeral 1 denotes a floating type magnetic head which is composed of a head slider 5 and a head core 10 provided with a winding 3. The magnetic head 1 is maintained in the floating state in which aerodynamic pressure produced by rotation (indicated by an arrow 9) of the disc 8 is balanced with a load given by the magnetic head 1 and represented by an arrow 2. Recording and reproduction of information are effected through a head gap 4 defined by the head core 10 and the head slider 5.

In connection with the magnetic disc memory apparatus of CSS type, it is however noted that adhesion takes place between the disc and the head slider, when the memory apparatus is left unused for a long time with the head remaining in contact with the head slider. In particular, when a lubricating oil is applied over the disc surface with a view to lengthening the useful life of the CSS disc system, as practiced commonly at present, the phenomenon of adhesion becomes more apparent. Moreover, if the memory system is left in an environment of high humidity, adhesion becomes more serious. Of course, adhesion by itself exerts substantially no adverse influence to the inherent function (i.e. recording and reproduction of information) of the memory system. However, when the disc is rotated starting from the state where the head is adhesively contacted to the disc surface, the head tends to be pulled in the circumferential direction of the disc due to the adhesion, resulting possibly in that gimbal and the like which support the head slider becomes injured or destroyed. Referring to FIG. 2 of the accompanying drawings, the head slider 5 is shown as supported by the gimbal 11 and applied with a load by a load arm 12 in the direction facing toward the disc surface. Assuming now that the head slider 5 is in adhesive contact with the disc surface 8 in the stationary state, rotation of the disc 8 starting from this state will cause the head slider 5 to be pulled and displaced in the circumferential direction of the disc 8, involving eventually deformation and possibly destruction of the gimbal 11 supporting the head slider 5, in case the adhesion is significant. On the other hand, in case the adhesion is less significant, the head slider will be precipitantly detached from the disc surface, having overcome the adhesion, at the instant when the head slider has been slightly displaced. Under the shock at that time, the disc surface will be bruised. In this manner, when the rotation of disc is started in the state where the head slider is adhesively contacted to the disc surface, the disc memory system will undergo damage and destruction in the worst case. To solve the difficulty encountered in the starting phase of operation of the magnetic disc memory of CSS type mentioned above, there have been heretofore adopted the following measures. First, the surface roughness of the disc surface is increased at the expense of the recording characteristics, to thereby prevent more or less occurrence of the adhesion; second, the quantity of lubricating oil applied over the disc surface is decreased; third, a desiccating agent is placed in the interior of the disc memory system to suppress increasing of humidity within the system, and so forth. However, these measures are ineffective for attaining a complete obviation of the adhesion phenomenon and do not provide fundamental remedy. Under the circumstances, the environmental conditions in which the CSS type memory system is used have to be necessarily regulated particularly in respect of humidity. And, false manipulation of the disc memory system by operator or user will lead directly to injury or destruction of the memory system, involving thus inconveniences in manipulation or handling of the disc memory.

SUMMARY OF THE INVENTION

An object of the present invention is to provide a magnetic disc memory apparatus of CSS type in which means is provided for protecting completely the memory apparatus from injury or destruction ascribable to the phenomenon of adhesion between a head and a disc surface.

According to a feature of the invention, it is proposed that a magnetic head contacted to a disc surface is slightly moved in the direction radially of the magnetic disc immediately before the disc is rotated and thereafter the disc rotation is started.

In more particular, referring to FIG. 2, the gimbal structure 11 of the magnetic head for the CSS type disc memory apparatus (usually referred to as Winchester head) is very weak with respect to withstanding a pulling force in the rotating direction of the disc indicated by the arrow 9. However, the gimbal structure is very strong to a pulling force in the radial direction indicated by an arrow 13. Accordingly, when the magnetic head 1 of the floating type is pulled in the radial direction 13 immediately before the rotation of disc is started, adhesion possibly acting between the magnetic head and the disc can be overcome without giving any injury to the head supporting gimbal 11 and other elements, whereby the magnetic head can be safely set to the desired floating position.

DESCRIPTION OF THE PREFERRED EMBODIMENTS

Now, the invention will be described in detail in conjunction with exemplary embodiments thereof.

Figure 1:
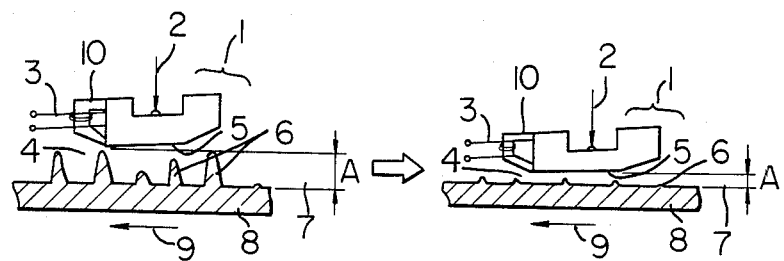
FIG. 1 is a fragmental side view of a CSS type magnetic disc memory to illustrate schematically surface roughness of a magnetic disc.
Figure 2:
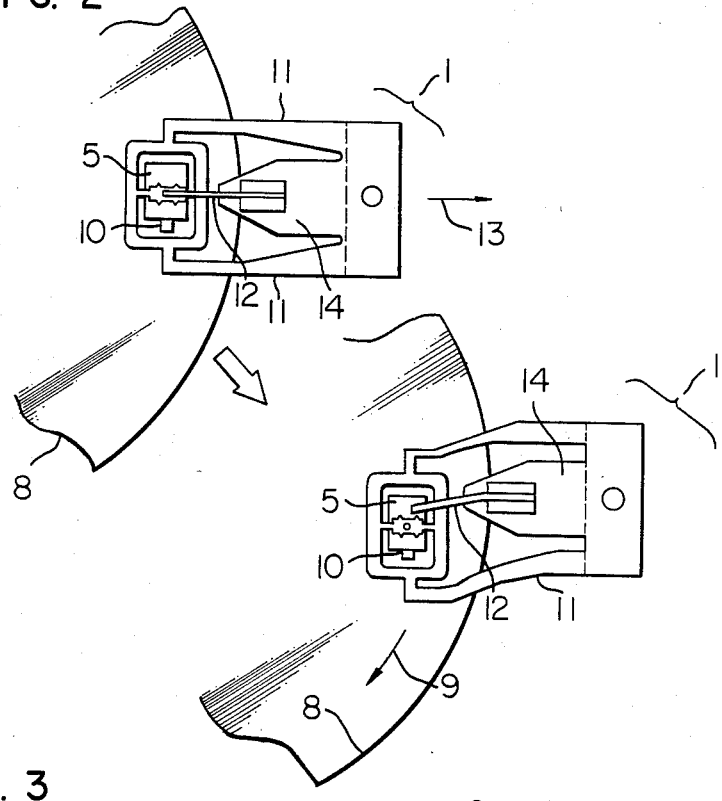
FIG. 2 is a plan view of a floating type magnetic head.
Figure 3:
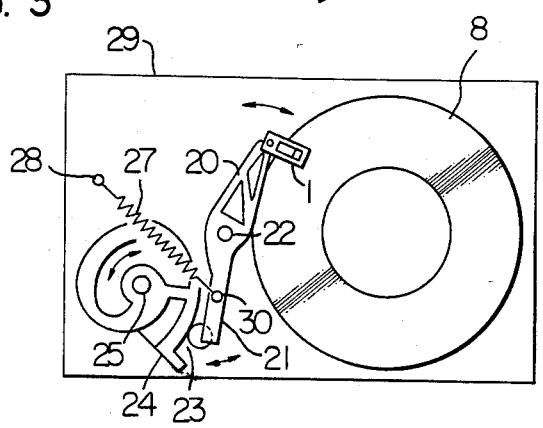
FIG. 3 is a plan view of a magnetic disc memory to which the invention can be applied.
Figure 4:
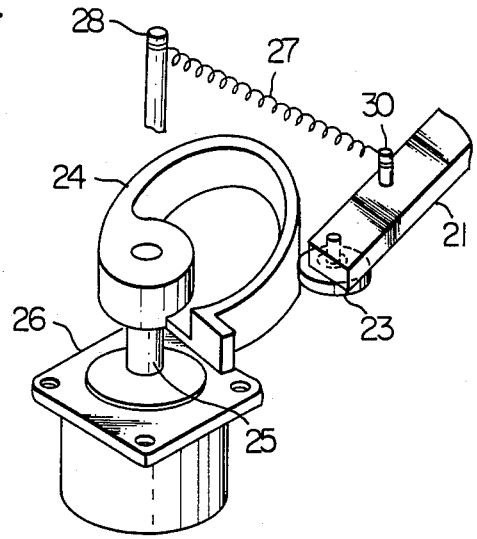
FIG. 4 is a perspective view showing a head positioning mechanism.
Figure 5:
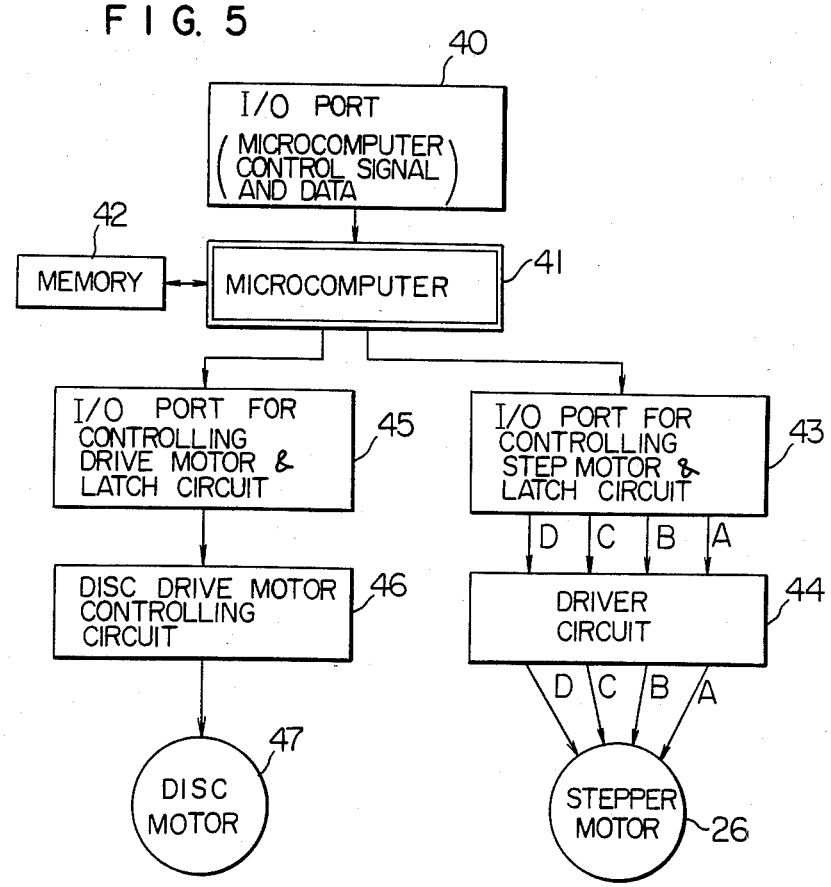
FIG. 5 is a block diagram of a control circuit which may be used in carrying out the invention.

Referring to FIGS. 3 and 4 which show schematically a structure of a magnetic disc memory apparatus to which the invention can be applied, a head bar 20 supporting a magnetic head 1 is fixedly mounted on a carriage 21 which in turn is mounted rotatably about a pivot 22. A cam follower 23 is provided at a free end of the carriage 21. On the other hand, a cam 24 is fixedly mounted on an output shaft 25 of a stepper motor 26 and adapted to be positioned in accordance with the excited phase of the stepper motor 26. The cam follower 23 mounted rotatably on the carriage 21 at the free end thereof is urged to bear on the cam 24 under a given pressure exerted by a spring 27 which has one end fixedly connected to a post 30 anchored in the carriage 21 and the other end connected fixedly to a post 28 mounted on a stationary base 29. When the stepper motor 26 takes an angular position in response to an electric signal, the cam 24 is positioned correspondingly, whereby the carriage 21 is rotated about the pivot 22 through cooperation of the cam follower 23 and the spring 27, resulting in that the magnetic head 1 is positioned precisely to a predetermined location or track on the surface of a magnetic disc which is adapted to be driven by a motor (not shown) directly coupled to a rotatable shaft of the disc 8. According to the teaching of the invention, the magnetic head 1 is moved slightly in the radial direction of the disc 8 immediately before the disc 8 is rotated with a view to obviating adhesion, as described hereinbefore. Next, description will be made in detail on means for realizing the teaching of the invention. Reference is now made to FIG. 5 which shows in a block diagram a control circuit used for carrying out the invention. When a start command signal for starting the rotation of the magnetic disc is received by an I/O (input/output) port 40, a microcomputer 41 (e.g., microcomputer NE8085 manufactured by Nippon Electric Co., Ltd.) sends a control signal to a latch circuit 43 which then controls a driver circuit 44 in a manner described hereinafter in conjunction with a flow chart shown in FIG. 6, to thereby drive the stepper motor 26. As a consequence, the magnetic head is caused to move a little bit in the radial direction. At the next step, the microcomputer 41 delivers to the latch circuit 45 a drive signal for driving a disc motor 47, whereby the control circuit 46 is driven by the latch circuit 45 to rotate the disc motor 47.

Figure 7:
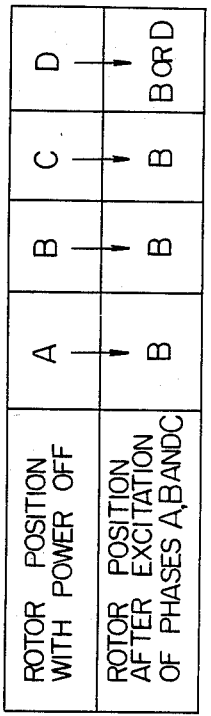
FIGS. 7, consisting of A–D and 8 illustrate incremental movements or steps of a rotor of a stepper motor.
Figure 8:
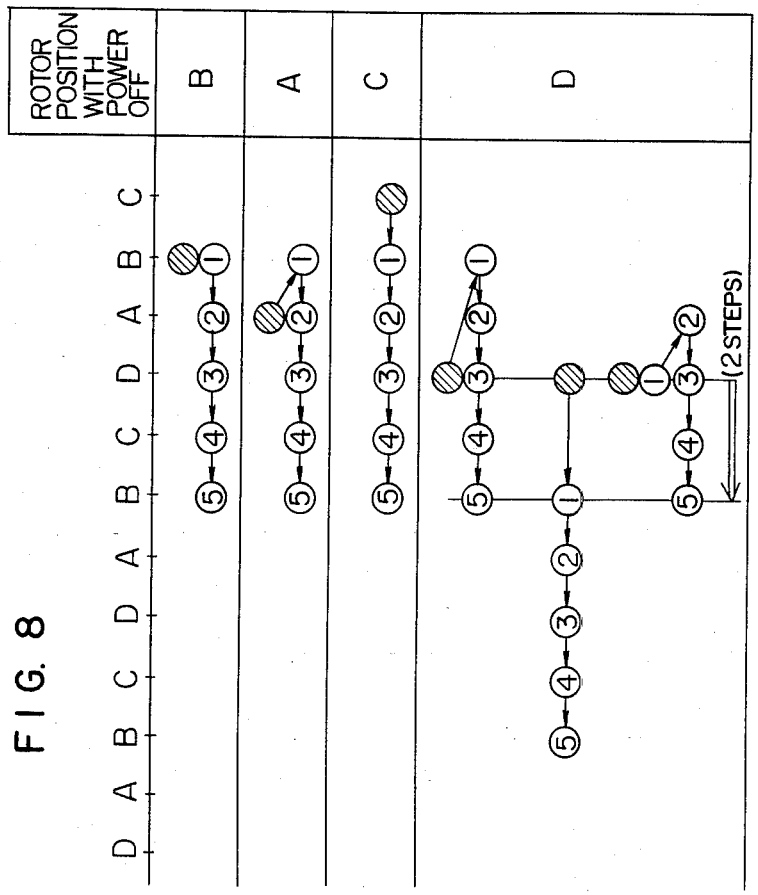
Figure 6:
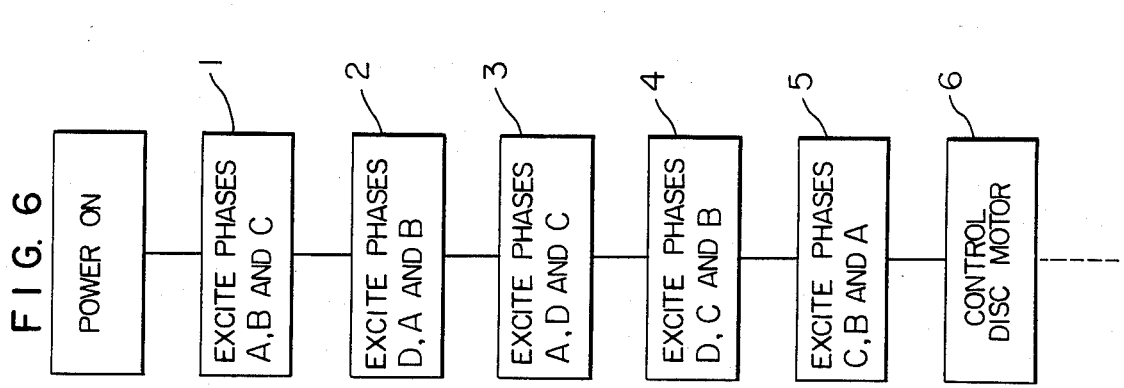
FIG. 6 is a flow chart to illustrate operation of the control circuit shown in FIG. 5.

In the case of the illustrated embodiment, a four-phase stepper motor of a hybrid type (incorporating a permanent magnetic rotor) is employed. Because it is impossible to determine which of the four phases (referred to as phases A, B, C and D, respectively) the stepper motor occupies or acquires before the power supply is turned on, a peculiar driving process illustrated in the flow chart of FIG. 6 is adopted. Referring to FIG. 6, when the power supply is turned on, initial excitation phases A, B and C of the stepper motor is excited at a step 1. Advance and stop positions of the rotor of the stepper motor depend on the position occupied by the rotor before the power is turned on in a manner illustrated in FIG. 7. Next, at a step 2, the excited phases of the stepper motor are changed over to the phases D, A and B from the phases A, B and C. The rotor will then advance or step to the phase A from the phase B. At the steps 3, 4 and 5, the excited phases of the stepper motor are changed over to the phases A, D and C, the phases D, C and B and the phases C, B and A, successively. The rotor responsively advances or steps from the phase A to the phase D, phase C and then to the phase B. Since the movement of the head corresponds to the phase position of the rotor, the head is finally stopped at the position corresponding to the phase B regardless of the phase position at the time when the power supply is turned off. Accordingly, the absolute displacement of the head can be assured by two steps at minimum. Reference is to be made to FIG. 8. In this figure, hatched circles represent the initial position, while numbered circles represent the sequence of the steps made by the rotor of the stepper motor. Referring again to FIG. 6, at a step 6, a command for rotating the disc is issued. In this way, there has been realized the magnetic disc memory apparatus in which the head is slightly moved in the radial direction (toward the outer periphery of disc) immediately before the rotation of disc is started.

As is appreciated from the foregoing description, the present invention has solved satisfactorily the problem of adhesion unique to the CSS type disc memory system and can assure an improved reliability in operation of the magnetic disc memory with a simple and inexpensive structure.

We claim:

1. A magnetic memory disc apparatus in which a magnetic head is in contact with a surface of a magnetic disc substantially at all times when the magnetic disc is stationary and caused to float upon rotation of the magnetic disc, comprising: a magnetic disc; a magnetic head supporting member; a gimbal mounted on said magnetic head supporting member at one end thereof; a magnetic head mounted on said gimbal; magnetic head positioning means for positioning said magnetic head at a desired track on said magnetic disc by way of said magnetic head supporting member; means for rotating said magnetic disc; and control means for energizing said magnetic head positioning means and said means for rotating said magnetic disc, said control means prior to energizing said means for rotating said magnetic disc energizing said magnetic head positioning means to displace said magnetic head from a contact position thereof with a surface of said magnetic disc in a radial direction of said magnetic disc so as to obviate adhesion between said magnetic head and said magnetic disc before starting rotation of said magnetic disc.

2. A magnetic disc memory apparatus as set forth in claim 1, wherein said magnetic head positioning means includes a stepper motor and a cam mounted on said stepper motor for controlling movement of said magnetic head supporting member.

3. A magnetic disc memory apparatus as set forth in claim 2, wherein said stepper motor is constituted by a hybrid type stepper motor having a rotor of four phases which are assumed to be represented by phases A, B, C and D, the sequence of changing over of excitation of said rotor effected before starting of rotation of said magnetic disc being selected such that excitation of the phases A, B and C is followed by excitations of the phases D, A and B, the phases A, D and C, the phases D, C and B and then the phases C, B and A in this order.

4. A magnetic disc memory apparatus in which a magnetic head is in contact with a surface of a magnetic disc substantially at all times when the magnetic disc is stationary and caused to float upon rotation of the magnetic disc, comprising: a magnetic disc; a shaft; a magnetic head supporting member mounted rotatably on said shaft; a gimbal mounted on said magnetic head supporting member at one end thereof; a magnetic head mounted on said gimbal; a cam follower mounted on said magnetic head supporting member at the other end thereof; a cam disposed so as to be contacted to said cam follower, a stepper motor on which said cam is mounted; means for rotating said magnetic disc; and control means for energizing said stepper motor and said means for rotating said magnetic disc, said control means prior to energizing said means for rotating said magnetic disc energizing said stepper motor to move said magnetic head from a contact position thereof with a surface of said magnetic disc in a direction radially of said magnetic disc so as to obviate adhesion between said magnetic head and said magnetic disc before starting rotation of said magnetic disc.

5. A magnetic disc memory apparatus as set forth in claim 4, wherein said stepper motor is constituted by a hybrid type stepper motor having a rotor of four phases which are assumed to be represented by phases A, B, C and D, the sequence of changing over of excitation of said rotor effected before starting of rotation of said magnetic disc being selected such that excitation of the phases A, B and C is followed by excitations of the phases D, A and B, the phases A, D and C, the phases D, C and B and then the phases C, B and A in this order.

6. A magnetic disc memory apparatus comprising a magnetic disc, a magnetic head, means for supporting said magnetic head so that said magnetic head is in contact with a surface of said magnetic disc substantially at all times when said magnetic disc is stationary and for enabling said magnetic disc to float upon rotation of said magnetic disc, magnetic head positioning means for positioning said magnetic head at a desired track on said magnetic disc by way of said magnetic head supporting means, means for rotating said magnetic disc, and control means for energizing said magnetic head positioning means and said means for rotating said magnetic disc, said control means prior to energizing said means for rotating said magnetic disc energizing said magnetic head positioning means to displace said magnetic head from a contact position thereof with a surface of said magnetic disc in a radial direction of said magnetic disc so as to obviate adhesion between said magnetic head and said magnetic disc before starting rotation of said magnetic disc.

7. A magnetic disc memory apparatus as set forth in claim 6, wherein said control means energizes said magnetic head positioning means to displace said magnetic head in an outward radial direction of said magnetic disc from the contact position thereof.

8. A magnetic disc memory apparatus as set forth in claim 6, wherein said control means energizes said magnetic head positioning means to displace said magnetic head from the contact position thereof with the surface of said magnetic disc to another contact position of said magnetic head with the surface of said magnetic disc before starting rotation of said magnetic disc.

9. A magnetic disc memory apparatus as set forth in claim 8, wherein said magnetic head supporting means maintains said magnetic head in contact with the surface of said magnetic disc during the displacement of said magnetic head from the contact position thereof to the another contact position.

10. A magnetic disc memory apparatus as set forth in claim 6, wherein said magnetic head supporting means includes a magnetic head supporting member and a gimbal mounted on said magnetic head supporting member at one end thereof.

11. A magnetic disc memory apparatus as set forth in claim 10, wherein said magnetic head positioning means includes a stepper motor and a cam mounted on said stepper motor for controlling movement of said magnetic head supporting member.

12. A magnetic disc memory apparatus as set forth in claim 11, wherein said stepper motor is of a hybrid type having a rotor of four phases assumed to be represented by phases A, B, C and D, said control means controlling the sequence of changing over of excitation of said rotor effected for starting of rotation of said magnetic disc so that excitation of the phases A, B and C are followed by excitations of the phases D, A and B, the phases A, D and C, the phases D, C and B and then the phases C, B and A in this order.

* * * * *